US007004402B2

(12) United States Patent
Borders et al.

(10) Patent No.: US 7,004,402 B2
(45) Date of Patent: Feb. 28, 2006

(54) APPARATUS AND METHOD FOR CONFIGURING, INSTALLING AND MONITORING SPRAY COATING APPLICATION SYSTEMS

(75) Inventors: Lenzie Borders, Cleveland Heights, OH (US); Bernadette L. Keaton, Lorain, OH (US); Irene M. Kellett, Amherst, OH (US); David Mancuso, Westlake, OH (US); Mark W. Novotny, Avon Lake, OH (US); Vincent Prieto, Avon Lake, OH (US); John R. Roos, Wakeman, OH (US); Susan Safos, North Olmsted, OH (US)

(73) Assignee: Nordson Corporation, Westlake, OH (US)

( * ) Notice: Subject to any disclaimer, the term of this patent is extended or adjusted under 35 U.S.C. 154(b) by 188 days.

(21) Appl. No.: 09/921,480

(22) Filed: Aug. 3, 2001

(65) Prior Publication Data

US 2002/0047051 A1 Apr. 25, 2002

Related U.S. Application Data

(60) Provisional application No. 60/227,109, filed on Aug. 22, 2000.

(51) Int. Cl.
*A01G 27/00* (2006.01)

(52) U.S. Cl. ........................ 239/69; 700/236; 700/239; 700/240; 700/244; 700/282; 700/285

(58) Field of Classification Search ................. 239/69, 239/690.1, 708; 118/696, 695, 712, 665, 118/688, 698, 713; 356/421, 243.5; 204/580; 700/241, 239, 232, 283, 284, 285, 282, 240, 700/236, 244
See application file for complete search history.

(56) References Cited

U.S. PATENT DOCUMENTS

| | | | | |
|---|---|---|---|---|
| 4,941,182 A * | 7/1990 | Patel | .......................... | 382/141 |
| 5,151,896 A | 9/1992 | Bowman et al. | | |
| 5,251,302 A | 10/1993 | Weigl et al. | | |
| 5,696,898 A | 12/1997 | Baker et al. | | |

(Continued)

FOREIGN PATENT DOCUMENTS

EP 0 847 008 A2 10/1998

(Continued)

*Primary Examiner*—Dinh Q. Nguyen
(74) *Attorney, Agent, or Firm*—Calfee, Halter & Griswold LLP

(57) ABSTRACT

A system and related methods for configuring and monitoring a material application system for installation and use at a site that is remotely located from the material application system manufacturing site. The system provides a configuration module that allows a customer or purchaser to configure a system electronically based on the customer's spraying needs. The selected configuration may further be linked to a pricing and inventory database module to allow the customer to order the system components, and obtain price and delivery schedules. The configuration module is available to the customer via a secure web site over the Internet provided by a server accessed from a computer such as a personal computer. The system also provides an extranet, for example, via the Internet or other communication link, is used to provide an accessible database for historical data and configuration/installation information.

15 Claims, 9 Drawing Sheets

U.S. PATENT DOCUMENTS

| | | | |
|---|---|---|---|
| 5,699,350 A | 12/1997 | Kraslavsky | |
| 5,734,831 A | 3/1998 | Sanders | |
| 5,805,442 A | 9/1998 | Crater et al. | |
| 6,061,603 A | 5/2000 | Papadopoulos et al. | |
| 6,073,055 A * | 6/2000 | Jahn et al. | 700/97 |
| 6,311,101 B1 | 10/2001 | Kastner | |
| 6,516,239 B1 * | 2/2003 | Madden et al. | 700/115 |
| 6,522,977 B1 * | 2/2003 | Corrigan et al. | 702/32 |
| 2003/0110101 A1 * | 6/2003 | Friel et al. | 705/28 |

FOREIGN PATENT DOCUMENTS

| | | | |
|---|---|---|---|
| EP | 0 917 034 | A1 | 5/1999 |
| WO | WO 98/53581 | A1 | 11/1998 |
| WO | WO 00/04427 | A1 | 1/2000 |
| WO | WO 01/22177 | A1 | 3/2001 |
| WO | WO 01/25859 | A1 | 4/2001 |

* cited by examiner

CONFIGURATOR WIZARD

STEP #1 HIGH PRESSURE >100 PSI FLUID PRESSURE -OR- LOW PRESSURE < 100 PSI FLUID PRESSURE
☐ HP
☐ LP

STEP #2 ELECTROSTATIC -OR- NON-ELECTROSTATIC
☐ E/S
☐ NON E/S

STEP #3 MANUAL -OR- AUTOMATIC SYSTEM
☐ MANUAL
☐ AUTOMATIC

STEP #4 WATER BORNE -OR- SOLVENT BORNE MATERIAL
☐ WATER BORNE
☐ SOLVENT BORNE

STEP #5 HEATED -OR- NON-HEATED SYSTEM
☐ HEATED
☐ NON-HEATED

STEP #6 ASSIGN PRIORITIES TO THE FOLLOWING FACTORS 1 - 4
☐ CAPACITY/THROUGH
☐ TRANSFER EFFICIENCY
☐ FINISH QUALITY
☐ LABOR SAVINGS

STEP #7 CONFIGURE SYSTEM NOW -OR- MODIFY CHOICES

258

CONFIGURED SYSTEM

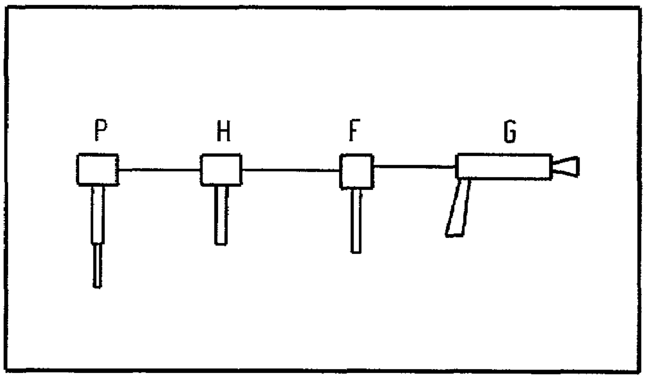

MODIFY CHOICES | GENERATE BILL OF MATERIALS

BILL OF MATERIALS:

1 ELECTROSTATIC SPRAY GUN
1 64B 15:1 CORROSION RESISTANT PUMP
1 NH4 HEATER
1 FLUID FILTER 260
262

QUOTATION | AVAILABILITY | MODIFY CHOICES

*Fig. 3B*

APPARATUS AND METHOD FOR CONFIGURING, INSTALLING AND MONITORING SPRAY COATING APPLICATION SYSTEMS

RELATED APPLICATION

This application claims the benefit of U.S. Provisional patent application Ser. No. 60/227,109 filed on Aug. 22, 2000, the entire disclosure of which is fully incorporated herein by reference.

FIELD OF THE INVENTION

The invention relates generally to material spraying and application systems including liquid and powder coating application systems. More particularly, the invention relates to configuring, installing and monitoring such systems from remote locations such as a field site or production/manufacturing site.

BACKGROUND OF THE INVENTION

Material application systems may be broadly categorized as liquid or powder spraying systems. Liquid spraying systems may include, though not limited to, paint, adhesives, conformal coatings, lacquers, powder slurries and so forth. Powder spraying systems may include powder paint coatings and other non-paint materials in powder form such as lubricants (for example, powdered graphite) and food additives such as flavorings and coatings for example; and powdered superabsorbants such as may be applied to diapers.

Spray application systems can be rather complex systems in terms of various control and safety functions. Such systems include an array of one or more spray guns or spraying devices, pumps, material feed centers and overspray recovery systems. Some spray application systems include electrostatic spraying devices and most use pneumatic pressure as part of the application process. Many parameters may be monitored and adjusted including electrostatic voltage and current, air pressure, material pressure, flow rates, spray gun position, pump flow rates and so forth. Also, parts may be sprayed in a stationary condition within a spray booth or while moving through a spray booth via a conveyor system. Thus, an application system may include a number of sensors for position and speed control of the conveyor system, as well as sensors associated with triggering control of the spraying devices.

Spray application systems are generally designed to maximize throughput while minimizing the amount of sprayed material, particularly to minimize the amount of overspray since overspray material does not adhere to the part being sprayed. Various spray patterns are available based on the type of spray nozzle selected as well as the type of application system used. Accordingly, when a customer or end user is deciding what type of system to install at a site, there may be a large number of available options in equipment, just as there are many different types of parts to be sprayed and materials to be applied to such parts.

Heretofore, the process of configuring, installing and monitoring/maintaining spraying application systems has been accomplished by time consuming and personnel intensive processes. For example, a customer or purchaser might first visit the manufacturer's site to observe the different spraying systems available and witness various spraying demonstrations. A system is then recommended based on the needs of the customer. The system may be built at the manufacturing plant first, test run in order to set optimal parameters, and then shipped to the customer's plant. The system is then installed and operated locally. If problems occur, typically a field service representative is then called out to the customer's site for troubleshooting and repair. Historical records of system performance and data histories, however, are typically site or customer specific, other than the possible feedback by the service representative to the manufacturing site. As to safety issues, fire detection systems are commonly used with electrostatic application systems. Such detection systems have self-diagnostics but still must be monitored routinely for proper operation.

The general and greatly simplified process described above is very time and labor intensive. Moreover, the process of detecting and/or predicting the need for repair and maintenance efforts often results in system downtime for the customer, which increases production time and cost.

The Internet and other information communication systems have greatly facilitated the ability of customers, for example, to study manufacturer's product and system offerings from the remote customer site. Catalog databases and online purchasing/ordering systems allow a customer to order parts directly from a desktop personal computer. Such catalog ordering systems have been commonly applied in many different product fields from the sales of books to purchasing cars and so forth. However, such known systems do not adequately address the problems associated with complex manufacturing systems, particularly spray application systems. Many times a customer may have minimal support personnel at their site for monitoring system performance. Online purchasing of parts from a catalog alone is inadequate for ordering complex spraying systems due to the wide variation in system configurations as well as the need to configure a system with compatible subsystems and components. Known Internet and Web based systems also do not facilitate repair and maintenance activities.

It is an object of the present invention to provide apparatus and methods for facilitating the configuring, installation and monitoring of spraying application systems by the use of a data and information exchange system that links a customer with the manufacturing site. Such a system will preferably facilitate real time and historical monitoring functions and system configuration functions.

SUMMARY OF THE PRESENT INVENTION

The invention provides a system and related methods for configuring and monitoring a spraying application system for installation and use at a site that is remotely located from the spraying system manufacturing site. In accordance with this aspect of the invention, the invention provides a configuration module that allows a customer or purchaser to configure electronically a system based on the customer's spraying needs. The selected configuration may further be linked to a pricing and inventory database module to allow the customer to order the system components, and obtain price and delivery schedules. In one embodiment, the configuration module is available to the customer via a secure web site over the Internet provided by a server accessed from a computer such as a personal computer at the customer's site.

In accordance with another aspect of the invention, the invention provides a remote access module that provides spraying system operation information to be monitored at the manufacturing site to determine how the spraying system is operating and whether repair or maintenance should be initiated. Safety related parameters may also be monitored as a backup to the primary monitoring activity performed at the customer's site. In one embodiment, the remote access module is implemented through the secure web site over the Internet. In accordance with a further aspect of the invention, an extranet or other suitable site available, for example, via the Internet or other communication link, is used to provide an accessible database for historical data and configuration/installation information.

These and other aspects and advantages of the invention will be readily understood and appreciated from the following detailed description of one or more embodiments of the invention with reference to the accompanying Figures.

DESCRIPTION OF THE FIGURES

FIGS. 3A and 3B illustrate exemplary configurator screens presented to a user;

DETAILED DESCRIPTION OF PREFERRED AND ALTERNATE EMBODIMENTS

Figure 1:
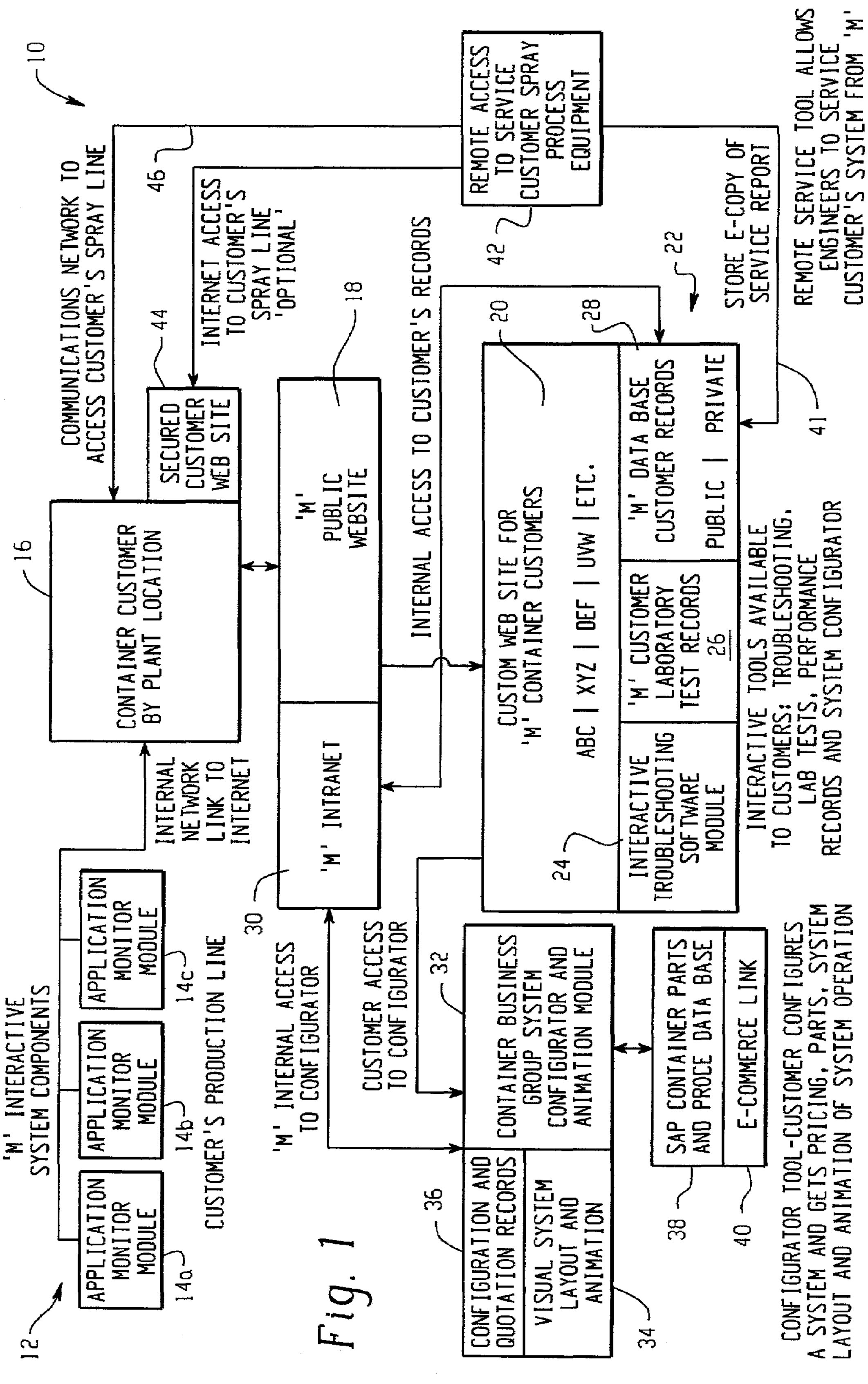
FIG. 1 is a functional block diagram of an information exchange system in accordance with the invention.

With reference to FIG. 1, the invention contemplates an information exchange system 10 that facilitates the electronic configuration and purchase operations, as well as supporting the installation and monitoring of a spraying application system 12 located at a customer production site. Such production sites are typically geographically remote or distant from the manufacturing site of the spraying application system. A customer may also have a number of production and support sites that are geographically remote from each other. A customer support site may include purchasing, production engineering and so forth. Although the exemplary embodiments of the present invention are described in the context of an Internet based information exchange or network system, those skilled in the art will appreciate that the Internet is but one example of an open undedicated communication system that may be used to practice the present invention. Additionally, dedicated communication links via land wire and wireless modem connections, optical communication systems, satellite communications and so forth are just a few examples of data and information exchange communication systems that may also be used with the present invention. The Internet is a preferred example because of the ability to access information across the open network from virtually any location in the world. By "open" is simply meant the ready access to the Internet network via a server connected thereto, it being recognized that secure access is available through various data encryption and password control scenarios.

Furthermore, although the described embodiments herein are in the context of exemplary spraying application systems, such examples are intended to be illustrative in nature and should not be construed in a limiting sense. The present invention may be used in a wide variety of material spraying application systems, including powder spraying systems and liquid spraying systems, and further may be used in connection with the spraying of a wide variety of articles such as but not limited to car parts, electronic components, metal parts, non-metal parts, cans and other containers including biodegradable containers, and so forth. The foregoing is not intended to be an exhaustive list by any means and should not be construed in a limiting sense. Additionally, some or all of the aspects of the present invention may find application outside the material spraying technologies. Still further, although the described embodiments incorporate various aspects of the invention into a single system, such description is for convenience and ease of understanding and not intended to be limiting. The various aspects of the invention may be used individually or in any number of various combinations in a particular system based on the particular needs of the customer. For example, a customer may avail itself of the configuration capability of the present invention but may decide not to incorporate a remote access and monitoring function, or vice-versa. The terms "customer" and "user" are used interchangeably herein and in a broad sense to identify anyone having access to the various features of the system.

In FIG. 1 then, the system 10 includes a customer manufacturing or production site 12 that may include one or more spraying application systems or system requirements. The production site 12 may include one or more spraying application system monitoring modules 14*a*, 14*b*, 14*c*. The monitoring modules 14*a,b,c* are realized in a conventional manner using a number of sensors, gauges, detectors, controllers, actuators, valves, pumps and so forth that are typically linked to a local primary control system (with possibly one or more local secondary controllers) such as a programmable logic controller (PLC) or other suitable control system at the customer's production facility 12. Alternatively for example a distributed embedded control system may be used. The monitoring modules 14*a, b, c* thus utilize a number of interactive system components that are provided by the manufacturer ("M") or other supplier, for example, to permit local monitoring and control functions via a controller. An example of such a local monitoring and control system is described in U.S. Pat. Nos. 6,132,511 and 5,167,714 the entire disclosure of which are fully incorporated herein by reference. Such patents may be referred to for details of a typical local control system but should not be construed as limiting of the present invention. Many types of local control systems are well known to those skilled in the art and a detailed description thereof herein is not necessary to the understanding and practice of the present invention. By "local" is simply meant that the control and monitoring functions are implemented within the customer's site, but may include the feature of dedicated LAN and WAN systems and other dedicated closed networked systems within the production site 12 and possibly linked to other dedicated closed network systems of the customer.

One or more of the monitor modules 14*a,b,c* may be connected to the Internet via a suitable interface controller and software module 16. The interface module 16, for example, may be realized based on a Windows™ style or other suitable platform that provides data and other information that is accessible via a web site 18 and web page links accessible through the Internet. The Internet access may be carried out in a conventional manner using a server that is connected to the Internet. In this embodiment of the invention, the top level web site 18 is a public accessible web site and web page maintained on a server that is under the control of the manufacturer M. The specific customer information and data however is accessed only through a secure customer specific web page 20 link from the main page. Of course, a customer might not require a secure link but it is expected that in almost all cases a secure link will be used. A secure link may be realized, for example, by a required user name and password combination. Higher lever secure access features such as public and private key exchanges and so forth may be used as required. The web pages and sites may be implemented with conventional HTML language or other suitable software. The various databases described herein may be realized using conventional spreadsheet programs or custom programs.

Access to the secure customer specific web site 20 thereby provides access to databases 22 that are requested by or provided to the customer. The particular content of the databases 22 will be customer specific in many cases, however, in accordance with one aspect of the invention it is contemplated that the secure customer web site 20 may function as a customer extranet that is accessible by different customer production sites and support sites even if such sites are spread throughout the world. Alternatively, a customer may decide not to permit all of its sites to have full access to all databases within the extranet 20. Each customer site for example may have its own extranet 20 with a secure access feature to all such extranets 20 being granted to a central home office for example.

The databases 22 may include, for example, an interactive troubleshooting module 24, a laboratory test records module 26 and a general database of records 28. The test records module 26 database will typically be maintained by the manufacturer M based on system tests and initial setup parameters prior to shipping the application system 12 to the customer. The customer records database 28 may include a public section and a private section wherein the public section allows the customer to view historical data and other information unique to their facilities, whereas the private section permits a field technician or other representative of the manufacturer M to input repair and maintenance information into the manufacturer's more detailed database. In either case, the customer only has access to its specific databases 22.

In addition to the customer specific web site 20, the manufacturer M may also have access to its own Intranet site 30 via the public web site 18. Typically the Intranet site 30 will also be a secure access site available only to the manufacturer M. This Intranet site 30 may contain access to any number of databases and services pertinent to the operation of the manufacturer's business selected by the manufacturer M to be available on its Intranet, as is known in the art.

The invention also contemplates the capability for the customer to configure electronically a spraying application system 12 based on its requirements such as the type of articles being sprayed, the material being sprayed and so forth. In accordance with this aspect of the invention, via the customer web site or Extranet 20 the customer has access to a configurator module 32. The configurator module 32 may include a number of features as will be described hereinafter, including animation and other video functions 34. The configurator module 32 may have a configuration records database 36 for storing prior configuration requests and any associated price quotes. The configurator module 32 may also interface to a pricing and inventory module 38 that provides price and delivery information for various selected components of the configured system 12. A further link to an e-commerce marketing and sales site 40 may also be provided as required to permit conventional catalog sales and ordering processes.

The invention further contemplates a remote access function by which personnel at the manufacturing site M have access to the operation of the application system 12 at the customer's site. In accordance with this aspect of the invention, a remote access module 42 may be used to provide a communication link over the Internet or other communication network to permit the manufacturer M to monitor the system 12 performance. For example, the remote access module 42 may provide access to the customer's production site via a secure web site 44 that is maintained by the customer. Alternatively, the manufacturer may have access to the customer's site via a dedicated communication network 46 for added security. In either case, the monitored performance via the monitor modules 14*a,b,c* are thus accessible to the manufacturer's personnel such as service technicians and design engineers. The remote access module 42 may also include a link 41 to the database 22 to allow a field technician to update the database with the results of such an online field service activity. Although the link 41 is illustrated as direct to the database, in practice the link may be established through either the manufacturer's Intranet 30 or the extranet 20.

Figure 2A:
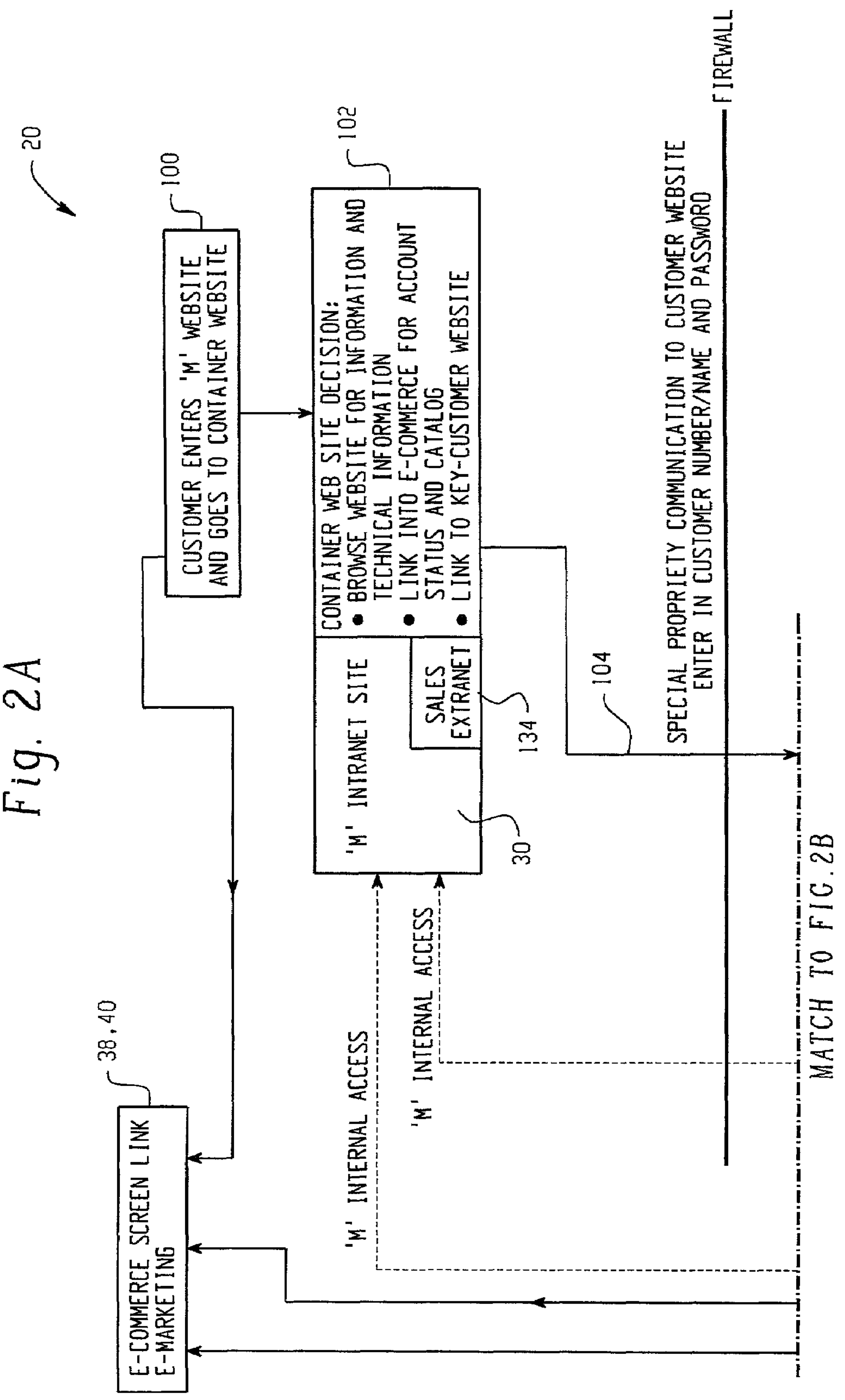
FIG. 2 is a functional block diagram and flowchart of a customer extranet site including maintenance, repair and information module such as may be used in the system of FIG. 1.
Figure 2B:
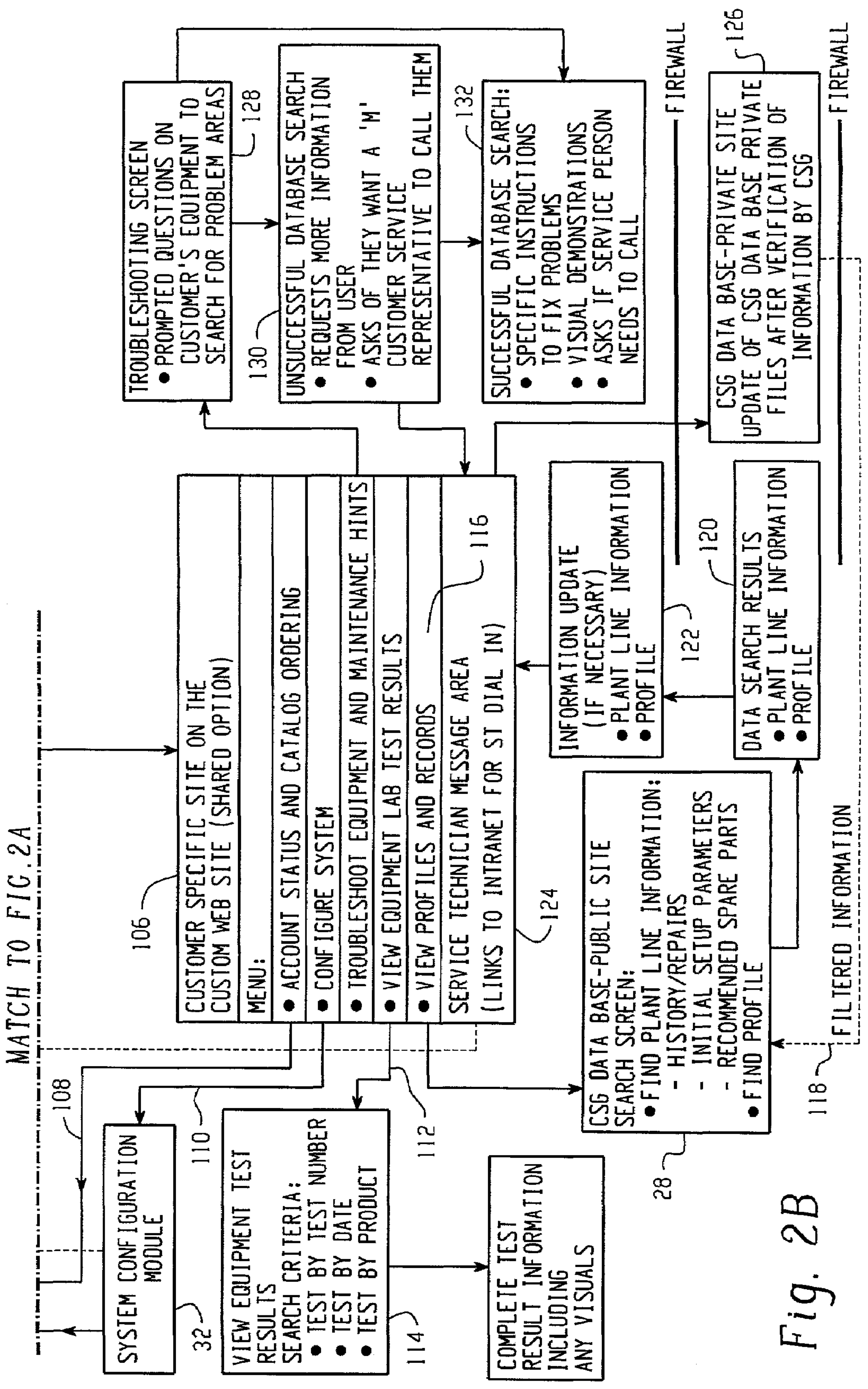

With reference to FIG. 2 then, an exemplary flowchart for the customer/user Extranet web site 20 is illustrated. At step 100 the customer enters the manufacturer's M public web page by any suitable connection to the Internet and selects the link to the specific product area 102 of interest, such as powder spraying systems, liquid spraying systems, container spraying systems and so on. The customer may then be presented at step 102 with a menu of choices including a link to the e-commerce catalog ordering and sales site 38, 40. The customer may also browse general information made available by the manufacturer M or may link to the customer's extranet site at step 104. The link into the customer's extranet will typically be through a secure web page such as by requiring a user name and password for example.

At step 106 the customer is presented another menu of options from within its extranet site. An order link 108 may connect the customer to the e-commerce site 38, 40 for pricing or status check of a customer specific order (it being recognized that the e-commerce site may be separately accessed by the customer from the main web site 18 if so desired). A second option 110 will link the customer to the configurator module 32. Another option 112 will link the user to an equipment test results database 114 which may be part of the laboratory test records module 26 (FIG. 1). The test results database 114 may include such information as test date, product identification, test results and so forth including video or other visual data of tests and so forth.

Another option in the user's extranet site 106 is a link 116 to the manufacturer's public database 28. This database may be maintained by the manufacturer M, the customer or both as required and will contain historical data relating to repairs, initial setup parameters, spare parts lists, system profile information and any other useful information the user may want to know about the operation, performance, maintenance and repair of the systems 12 in place. This database 28 is thus unique to the specific customer, and may be configured for access by all the customer's sites or only selected ones of the customer's sites. Separate databases may be provided for each customer site. An optional update link 118 may be used by the manufacturer to update the records database 28 based on the latest field reports, repair reports and so on. The customer and/or the manufacturer M may also update the database 28 via steps 120, 122 when changes are made to the system 12 such as repairs and upgrades for example.

The customer extranet site 20 may also be provided with access by the manufacturer's service technicians at step 124 to permit the service technicians to provide useful repair information. This information may be entered into the manufacturer's private database at step 126 and then the data may be filtered if so required prior to updating the customer's database 28. The service technician may also link from the customer's extranet page 106 into the manufacturer's Intranet site 30.

Another useful option presented to the user at the extranet site 106 is a troubleshooting module 128. When the system 12 is not spraying properly or other problems arise, the user may access the troubleshooting module 128 to obtain helpful suggestions as to possible solutions. The module 128 includes a database that stores typical problems and suggested solutions. The troubleshooting module 128 may also be an interactive function such as a message board or chat operation. The database may for example be developed from the manufacturer's historical data from the customer or all customers. At step 128 the user inputs system identification data and may type in a problem description. An unsuccessful search at step 130 may prompt additional questions or may suggest a service representative call. A successful search result 132 may be directly obtained from the initial query at step 128 or additional queries at step 130. In either case, a recommended or possible solution may be presented along with optional visual demonstrations.

FIG. 2 is exemplary in nature as to the types of functions that may be presented to the customer/user at its private extranet site. Those skilled in the art will appreciate that many other functions may be incorporated as required or some deleted as required. But the ability to provide customer specific troubleshooting functions, database searches and customer specific system configuration functions greatly enhance the effectiveness of the spraying application system operation within the customer's production site 12.

The manufacturer's private Intranet 30 may also include a secure extranet feature to permit access by the manufacturer's personnel for sales reports and related information. This database may include such information as news of recent installations, visual archives of installations, sales report information, laboratory test results and so forth.

Figure 3:
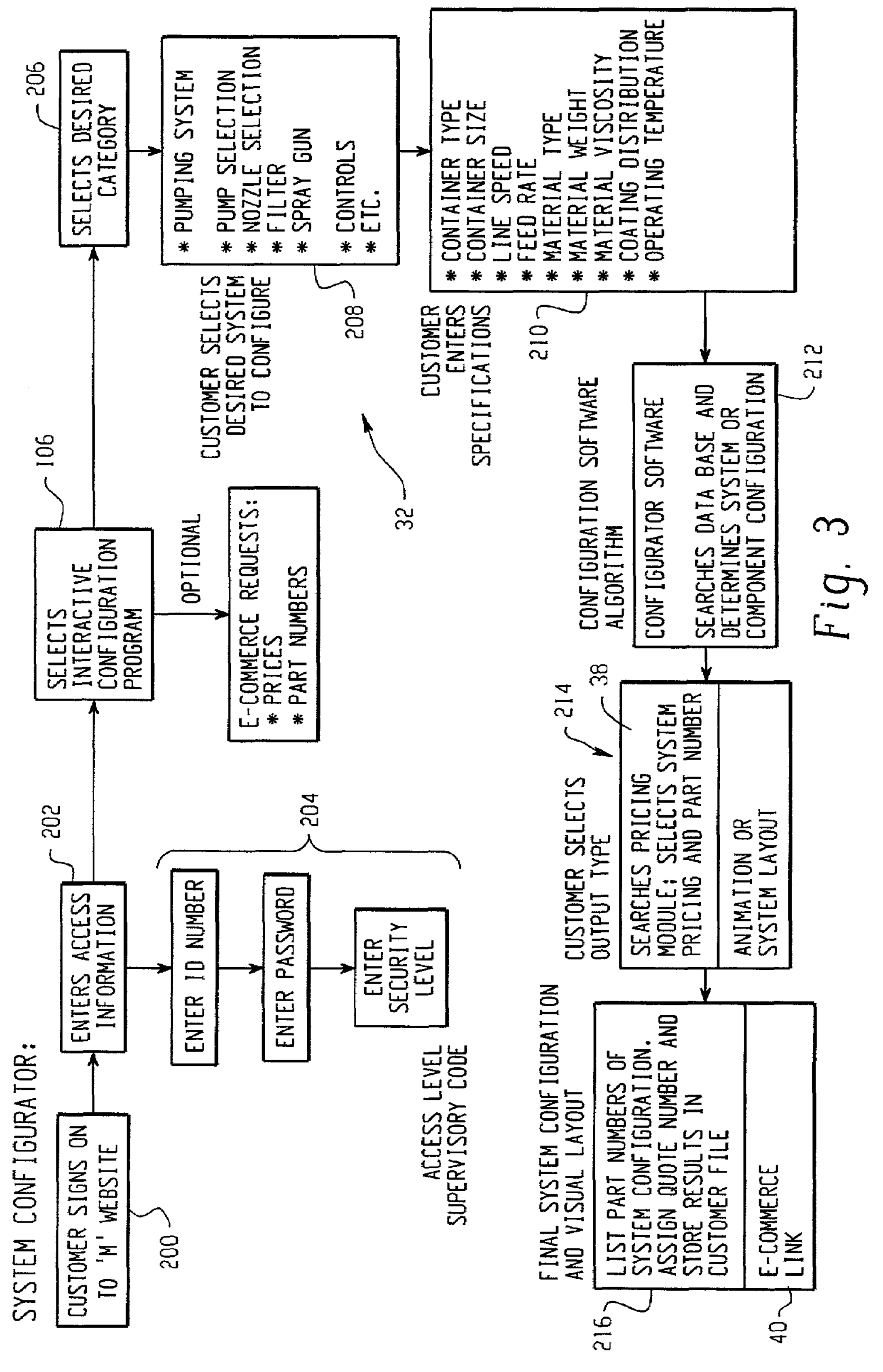
FIG. 3 is a functional block diagram and software flowchart of a configurator module such as may be used in the system of FIG. 1.

FIG. 3 provides an exemplary flowchart for a configurator module 32 (FIG. 1) which permits a user to electronically configure a spraying application system. At step 200 the user enters the public web site of the manufacturer M and at steps 202 and 204 enters the appropriate security access information for gaining access to the customer specific web site 20 (FIG. 1) as previously described hereinabove. At step 106 (FIG. 2) the user can select the configurator module 32, and specifically at step 206 selects the type of system to configure, such as a powder spraying system. At step 208 the customer selects the type of system components desired such as the pumping system and pump selection, nozzle selection, filters, gun design, control systems and so on. At step 210 the customer enters specific information to his particular application such as the type of material, article dimensions and type, conveyor feed rates, material type, weight, viscosity and so forth, as well as operating parameters such as temperature and desired coating characteristics such as film thickness. The data entered at steps 208 and 210 will be dependent on the particular customer spraying application needs. At step 212 the configurator software then can assimilate the data entered and perform a database query in order to recommend the various system components that the customer will need. Alternatively, if the customer is knowledgeable of the system components, the customer may directly select the components. The configurator software 212 may then be used to detect whether the customer has attempted to make an invalid combination of system components. At step 214 the configurator software may query the e-commerce pricing and delivery database 38 for pricing and delivery information, and may also present a visual representation of the selected system to the customer. Finally at step 216 the customer is presented with a configuration number, quote number and any other useful tracking information, and this data may be stored for later access. A link to the e-commerce ordering site 40 can then be used if so desired to place the order.

It should be noted that the manufacturer M may also provide a public configurator module that can be accessed from the manufacturer's public web site 18. This would permit a customer to "try out" various configurations using a pick and choose approach rather than basing the configuration on specific customer parameters.

Figure 3A:
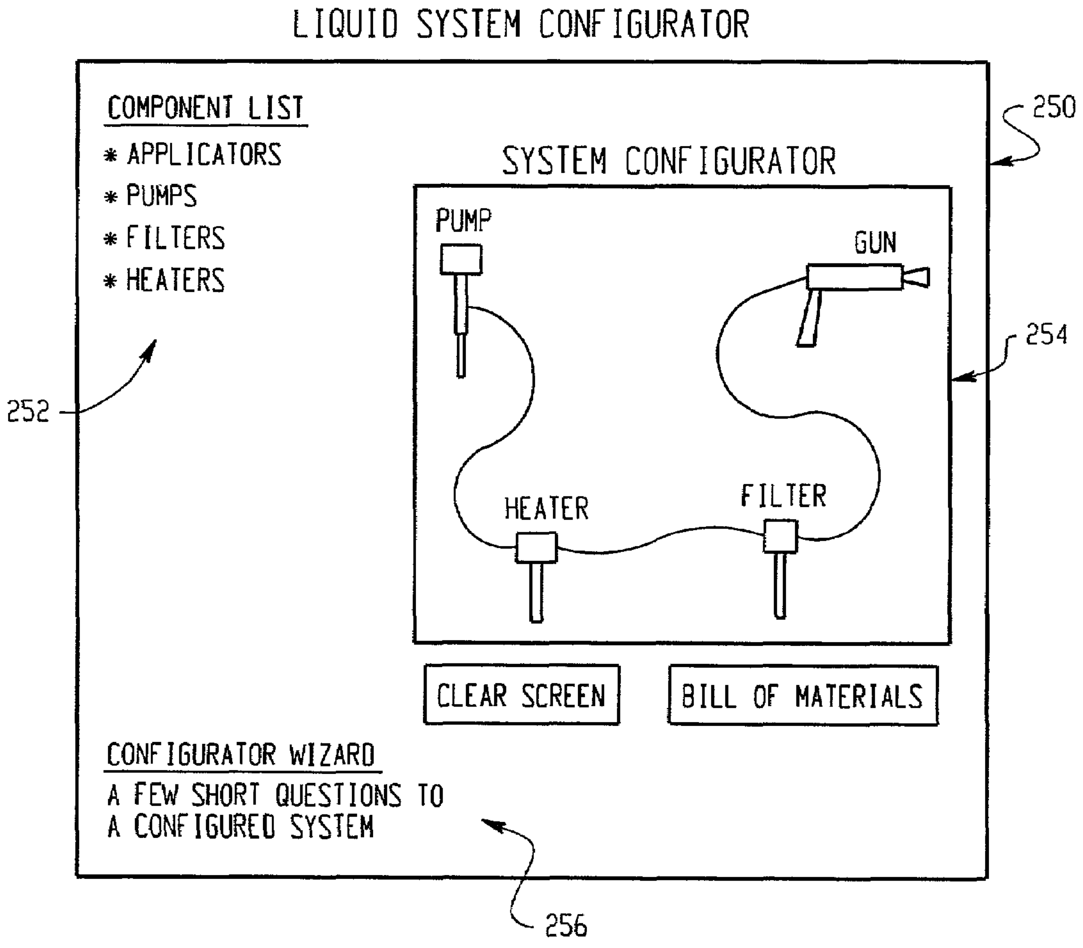

FIGS. 3A and 3B illustrate typical web pages that might be presented to a user as part of a configurator program. Many other options and methods of presentation may be used. In FIG. 3A, the main screen 250 provides a general component list 252 and a visual representation 254 of the system 12. The list 252 may provide a link for each component to a "drag and drop" style of selection menu for example. A configuration "wizard" option 256 may be provided to facilitate component selection based on a preset series of questions about the customer's particular spraying application. An example of a "wizard" option 256 is illustrated in FIG. 3B. FIG. 3B may be realized using a single screen or a series of screens. The software selects the components based on the answers to the questions 258 and at 260 provides a bill of materials. Various links 262 as previously described can be used to connect the user to the pricing, availability and ordering modules.

Figure 4:
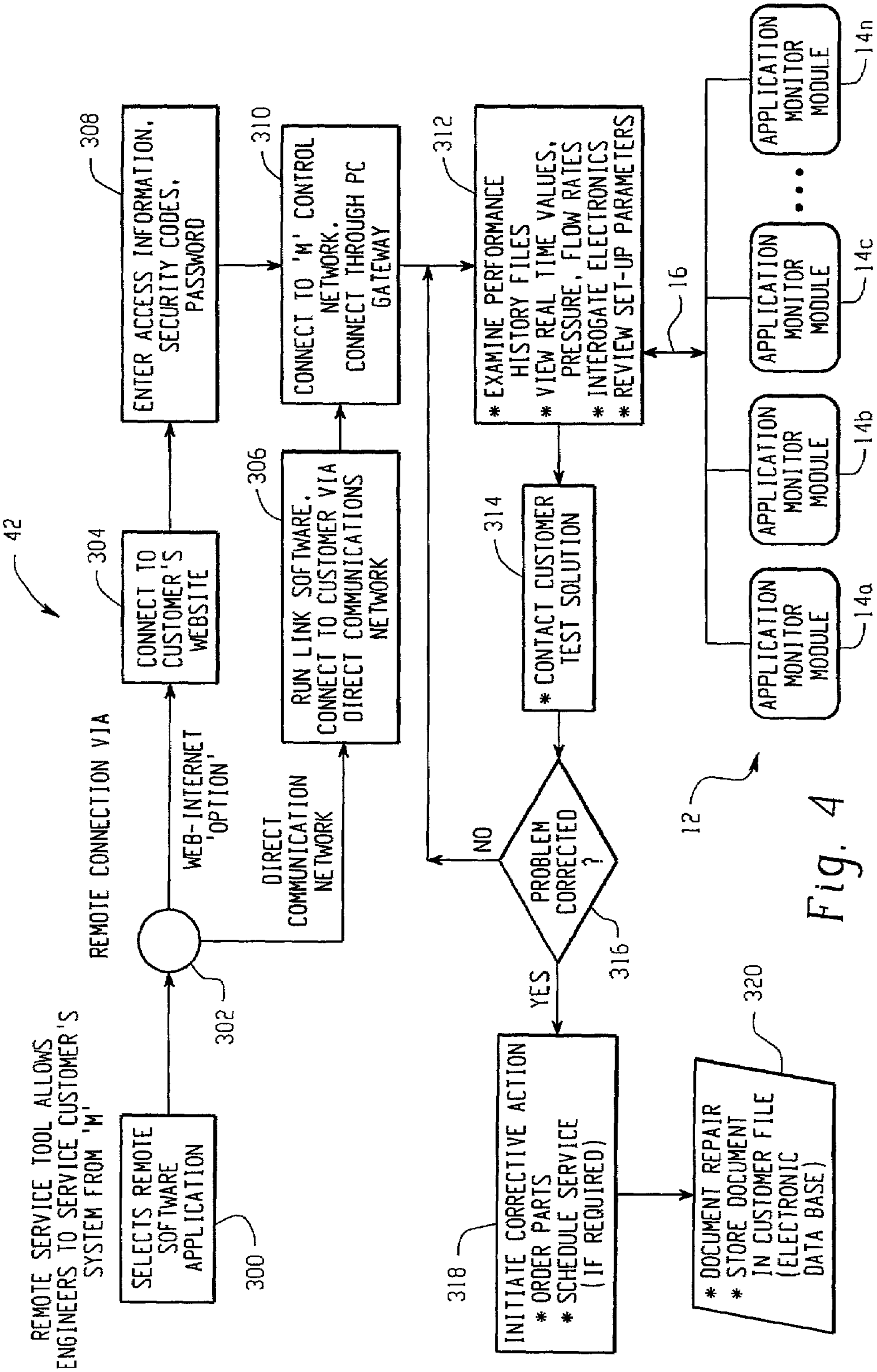
FIG. 4 is a flowchart of a remote access module such as may be used in the system of FIG. 1.

With reference to FIG. 4, an exemplary embodiment of a remote access module 42 is illustrated in flow diagram form as may be used, for example, by personnel of the manufacturer M, such as technicians and engineers. In this case, the user from the user's local computer at one of the manufacturer's M sites, selects remote access at step 300 which typically will be a customer specific software program that allows an interface to the various monitor modules 14_a,b,c_ at the customer's site 12. Alternatively, the modules 14 may be standardized thus permitting a single program to access different customer sites (provided appropriate security measures are maintained). At step 302 the user selects either an Internet based connection at step 304 or a direct or dedicated connection at step 306. Step 304 will require security access verification at step 308, while a direct connection at step 306 will connect via a data communication program which may be conventional. In either case the user connects into the manufacturer's control network at step 310. This connection provides direct access to the customer's Internet connection 16 (FIG. 1). At step 312 the user can monitor in real time various operating parameters at the customer's site including pressure, flow rates, fire detector status, review setup parameters and so on. At step 314 the customer is contacted to initiate a test solution. At step 316 if the problem was corrected, at step 318 corrective action is implemented by ordering parts as required with a service call scheduled and so forth. At step 320 the actions taken may be entered into the customer database 28 (FIGS. 1 and 2) and the manufacturer's private database 126 (FIG. 2). If at step 316 the problem was not corrected, the algorithm returns to step 312 for another test solution.

The remote access module 42 is particularly advantageous in supporting customers that may not have a large internal support function. The data collected by the manufacturer M may also be used with expert systems to provide predictive maintenance and repair functions. The remote access module 42 can be used to not only monitor manufacturer supplied components such as spray guns and pumps, and so forth, but also in connection with available software can monitor electronic devices such as encoders and proximity switches. A field service engineer, for example, may perform regular audits of a spraying application system direct from the engineer's desktop computer without having initially to travel to the customer's production site 12. Various parameters such as flame detection, dew point and proper grounding could be monitored and historically reviewed. Although most changes and adjustments would be implemented via contact with the customer, remote modifications and changes to various parameters such as pressure and flow rates may be implemented with the appropriate software.

Figure 5A:
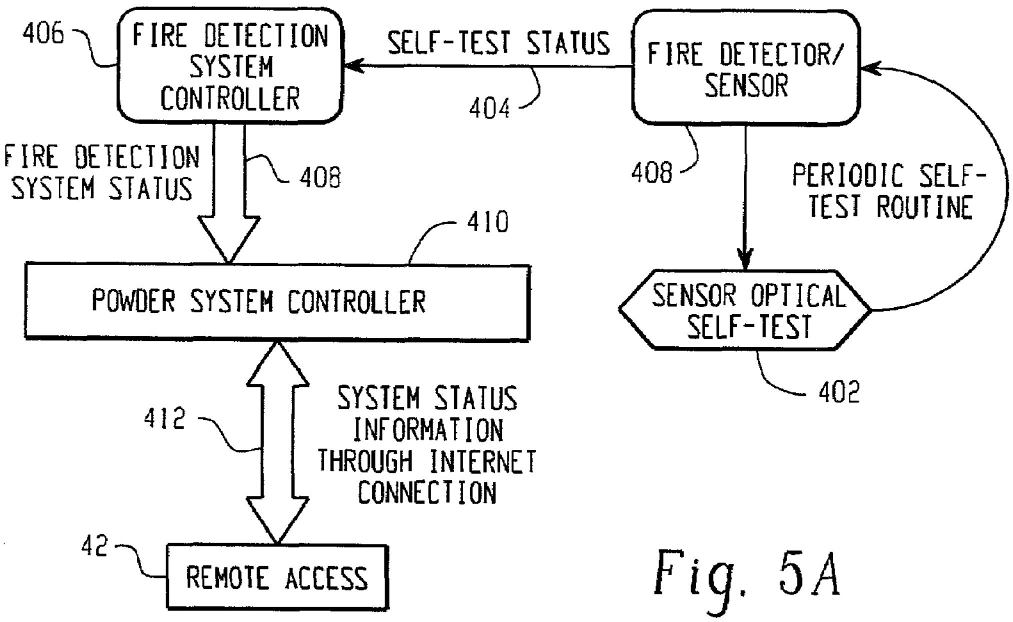
FIGS. 5A, 5B and 5C illustrate in functional block diagram form various application monitor functions that may be used with the present invention.
Figure 5B:
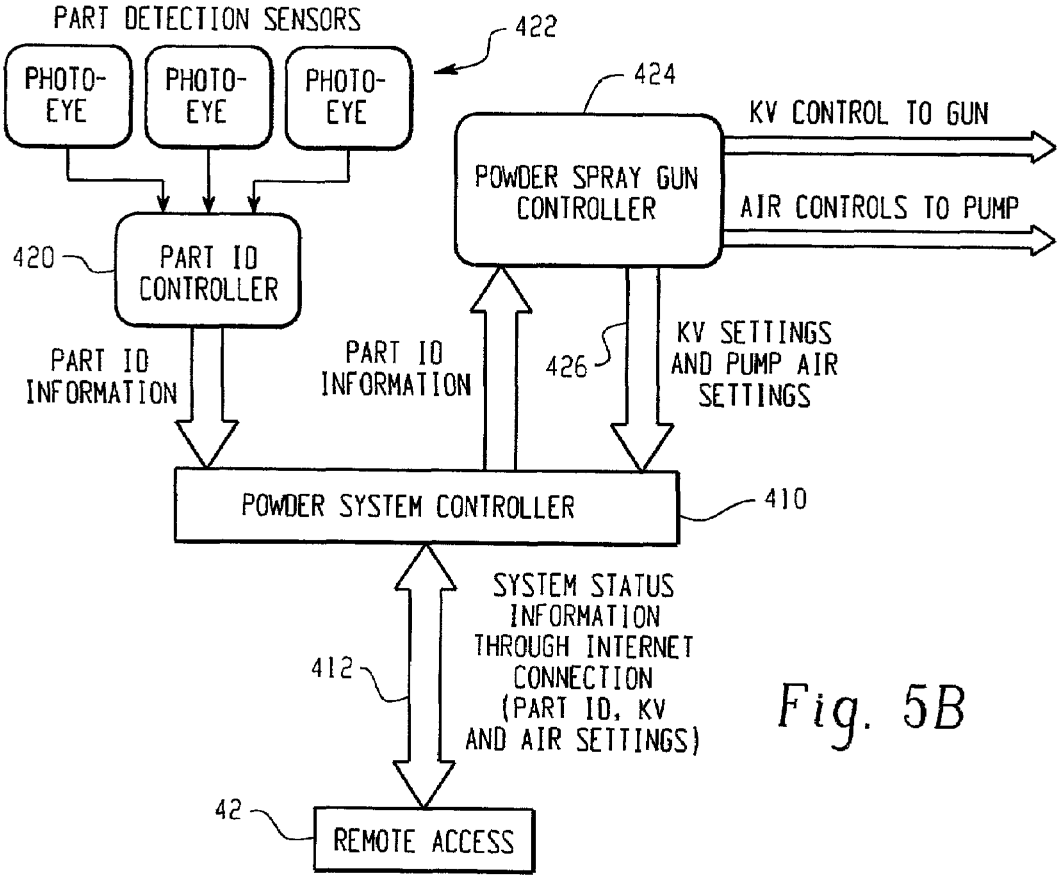
Figure 5C:
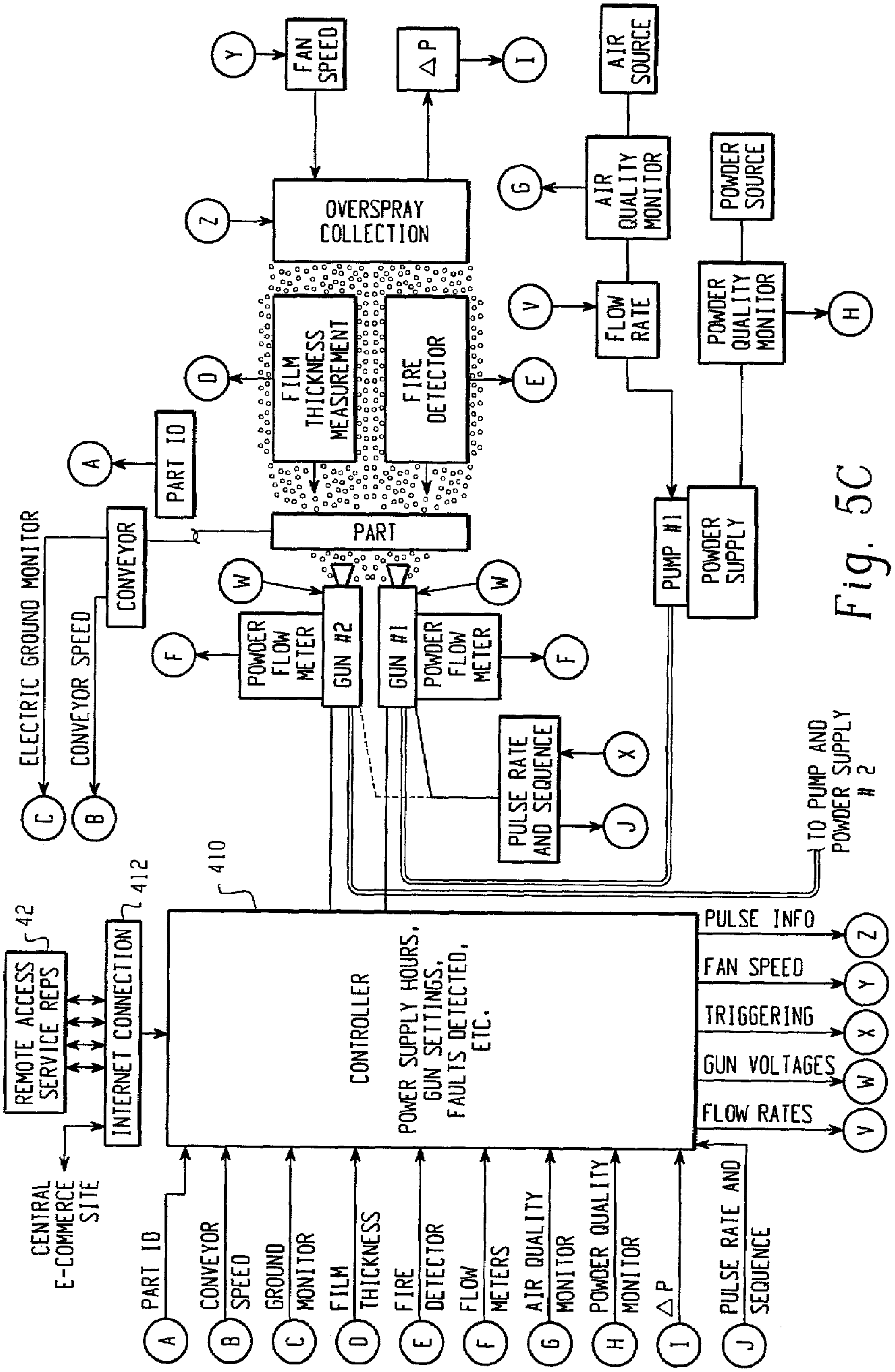

FIGS. 5A, 5B and 5C illustrate exemplary monitor modules 14 that may be used with the remote access concept of the present invention. Although the examples in FIGS. 5A–5C are related to a powder spraying system, such description is intended to be exemplary in nature. The concepts of the present invention are equally applicable to liquid spraying systems and spraying systems for containers, for example. In FIG. 5A a fire detection sensor 400 includes a self-test feature 402 and outputs a self-test status signal 404. The status signal 404 is input to the fire detection system controller 406 and further provides a status signal or signals to the main system controller 410. In this example the application system 12 is a powder spraying application system. The main controller 410 interfaces through the Internet via a link 412 to the manufacturer's system via the remote access module 42 as previously described herein. In FIG. 5B, operational parameters may be remotely monitored. The system controller receives various inputs from the part ID controller 420, which detects the part ID and position using a number of sensors 422. The main controller 410 interfaces with the spray gun controller 424, for example, although the main controller may interface to other subsystem controllers such as a gun mover, spray booth, powder feed center and so on. The subsystem controller 424 for example may control operation of an electrostatic gun and related powder feed pump. The gun controller 424 receives various feedback signals 426 including voltage and current values and settings, air pressure readings, flow rates and so on. These signals may then be formatted and made accessible to the remote access module 42 over the Internet or other suitable network communication system. In addition to fire detection and gun parameters, the main controller 410 may provide additional monitored parameters to the remote access module 42, such as for example, flow rates, ground monitors, fan speeds, pressure readings, dew points, triggering information, film thickness and so on. FIG. 5C illustrates a block diagram of various monitoring functions that may be provided to the manufacturer M via the remote access module 42. This is not intended to be an exhaustive list but exemplary in nature and should not be construed in a limiting sense as to the available functions to be monitored.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that invention not be limited to the particular embodiment disclosed as the best mode contemplated for carrying out this invention, but that the invention will include all embodiments falling within the scope of the appended claims.

We claim:

1. A system for monitoring and configuring a material application system of the type that uses different material application components including an application device such as a gun and a material delivery device such as a pump, the system comprising:

a user input device remotely located from a manufacturer's site for the system, the manufacturer's site being a site from which material application components including guns and pumps for a material application system may be ordered, purchased or manufactured;

one or more customer sites each having at least one respective material application system thereat, said customer site being remotely located from said manufacturer's site;

a manufacturer's database that is accessible over a communication network; a customer specific database that is accessible by said user input device over said network; wherein manufacturer system users at said manufacturer's site and customer system users at said customer's site have access to said customer specific database; said customer specific database comprising information relating to said material applications systems at said customer sites;

a configurator module accessible by said user input device via said network;

said configurator module presenting a menu of material application component selection options based on input data from said user input device; said input data comprising material application system criteria and at least a choice of first and second guns and first and second pumps; said configurator module verifying component compatibility to configure a valid material application system from said selected gun and pump material application components;

an application monitor module that receive operating data from a material application system at a customer site and that is accessible over said network: and a remote access module that allows a system user to access said operating data.

2. The system of claim 1 wherein said input device comprises a personal computer and said network comprises an Internet connection.

3. The system of claim 1 wherein said configurator module accesses a pricing and inventory database.

4. The system of claim 1 wherein said Internet connection comprises a secure Web site.

5. The apparatus of claim 1 wherein said configurator module operates from a server connected to the communication network.

6. The apparatus of claim 5 wherein said user input device accesses a database of test data and configuration data to facilitate troubleshooting.

7. The system of claim 1 comprising an animation module for presenting to the user a visual operational animation of a configured material application system.

8. The system of claim 7 wherein said animation module illustrates spray patterns for selected material application system configurations, said animation module being interactive to permit a user to make configuration changes and visually observe corresponding spray pattern changes.

9. The system of claim 1 wherein a user accesses said configurator module through a secure customer specific Internet web site.

10. The system of claim 9 wherein said secure customer specific web site is accessed from a manufacturer's site related public Internet web site.

11. The system of claim 9 wherein said secure customer specific Internet web site operates as a customer specific database site for a plurality of customer operations remote locations.

12. The system of claim 11 wherein said network provides access to a public manufacturing site database of historical data for troubleshooting.

13. The system of claim 12 wherein said animation module accepts modifications to material application system related parameters including spray gun position, system temperature or system pressure, and provides a visual animation to the user of system performance based on said modifications.

14. A system for monitoring and configuring a material application system of the type that uses different material application components including an application device such as a gun and a material delivery device such as a pump, the system comprising:

a user input device remotely located from a manufacturer's site for the system, the manufacturer's site being a site from which material application components including guns and pumps for a material application system may be ordered, purchased or manufactured;

one or more customer sites each having at least one respective material application system thereat, said customer site being remotely located from said manufacturer's site;

a manufacturer's database that is accessible over a communication network; a customer specific database that is accessible by said user input device over said network; wherein manufacturer system users at said manufacturer's site and customer system users at said customer's site have access to said customer specific database;

a configurator module accessible by said user input device via said network;

said configurator module presenting a menu of material application component selection options based on input data from said user input device; said input data comprising material application system criteria and at least a choice of first and second guns and first and second pumps; said configurator module verifying component compatibility to configure a valid material application system from said selected gun and pump material application components;

a database comprising information about a material application system at a customer site including configuration, material application components of the system, setup parameters, test data, repairs and modifications; said database being accessible for viewing and updating database records so that said database provides current and historical information about said material application system, said database being accessible by a system user from said manufacturer's site and from said customer sites over said communication network.

15. The system of claim 14 wherein said manufacturer's database comprises a manufacturer's intranet and said customer specific database comprises a customer specific extranet accessible through said manufacturer's intranet.

* * * * *